United States Patent [19]
Maerz

[11] Patent Number: 5,226,100
[45] Date of Patent: Jul. 6, 1993

[54] OPTICAL GRATING COMPRISING A PLURALITY OF SIDE-BY-SIDE OUTFEED END FACES OF OPTICAL WAVEGUIDES

[75] Inventor: Reinhard Maerz, Munich, Fed. Rep. of Germany

[73] Assignee: Siemens Aktiengesellschaft, Munich, Fed. Rep. of Germany

[21] Appl. No.: 749,693

[22] Filed: Aug. 26, 1991

[30] Foreign Application Priority Data

Sep. 21, 1990 [DE] Fed. Rep. of Germany ....... 4029971

[51] Int. Cl.$^5$ ............................................... G02B 6/34
[52] U.S. Cl. ........................................ 385/45; 385/46; 385/24; 359/569
[58] Field of Search ............... 350/96.11, 96.12, 96.15; 359/569, 566, 574; 385/14, 24, 39, 45, 46

[56] References Cited

U.S. PATENT DOCUMENTS

| | | | |
|---|---|---|---|
| 4,165,225 | 8/1979 | Auracher et al. | 65/4 |
| 4,440,468 | 4/1984 | Auracher et al. | 350/96.11 X |
| 4,515,428 | 5/1985 | Findakly | 385/45 |
| 4,609,252 | 9/1986 | Wong et al. | 350/96.12 |
| 4,756,587 | 7/1988 | Sano et al. | 350/96.12 |
| 4,953,935 | 9/1990 | Suchoski, Jr. | 385/46 |
| 4,979,789 | 12/1990 | Um | 350/96.11 X |
| 4,989,937 | 2/1991 | Mahlein et al. | 350/96.15 |

OTHER PUBLICATIONS

Takahashi, Arrayed-Waveguide Grating For Wavelength Division, E. Lett., vol. 26 No. 2, Jan. 18, 1990.
Smit, New Focussing and Dispersive Planar Component, E. Lett. vol. 24 No. 7, Mar. 31, 1988.
Smit, "New Focusing and Dispersive Planar Component Based on an Optical Phased Array", *Electronics Letters*, Mar. 31, 1988, vol. 24, No. 7, pp. 385-386.
Takahashi et al., "Arrayed-Waveguide Grating for Wavelength Division Multi/Demultiplexer with Nanometre Resolution", *Electronics Letters*, Jan. 18, 1990, vol. 26, No. 2, pp. 87-88.

Primary Examiner—John D. Lee
Assistant Examiner—S. W. Barns
Attorney, Agent, or Firm—Hill, Steadman & Simpson

[57] ABSTRACT

An optical grating being formed by a waveguide branching structure having a single infeed end face for infeeding an optical wave to be coupled into the grating, said branching structure is composed of a strip-like optical waveguide that proceeds from the infeed end face in a tree-like branching fashion and ends at the outfeed end faces, the distance between the infeed end face and each of the outfeed end faces can be the same or be different, as desired. The outfeed end faces can also be arranged to extend obliquely to the propagation direction of the optical wave being propagated in the grating.

20 Claims, 3 Drawing Sheets

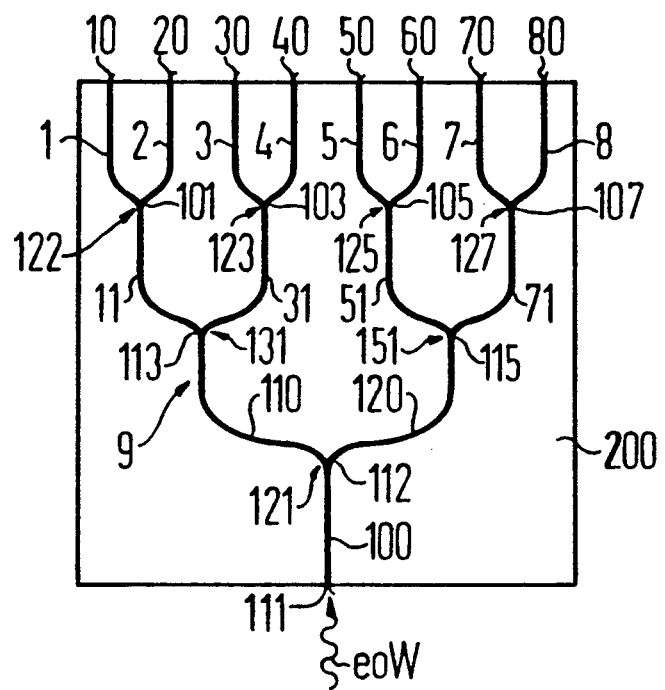
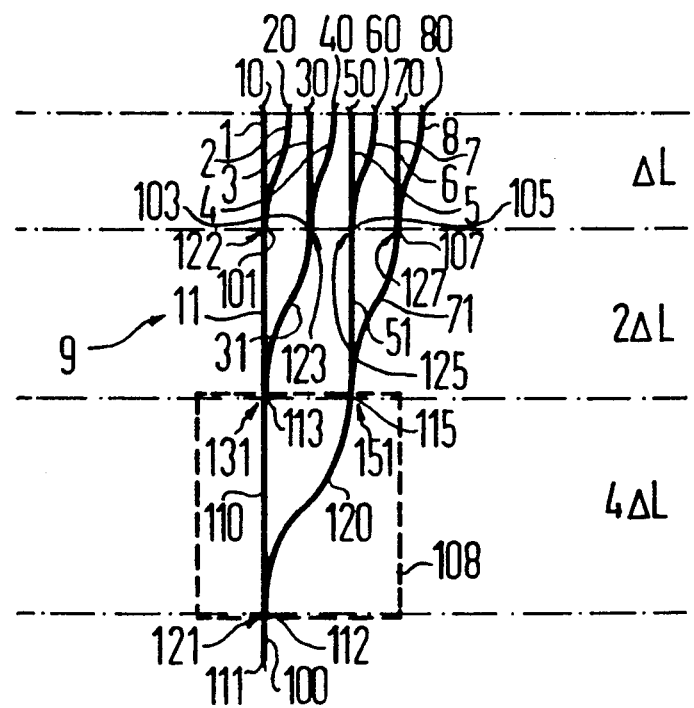

OPTICAL GRATING COMPRISING A PLURALITY OF SIDE-BY-SIDE OUTFEED END FACES OF OPTICAL WAVEGUIDES

BACKGROUND OF THE INVENTION

The present invention is directed to an optical grating having a plurality of side-by-side outfeed end faces of a plurality of strip-like optical waveguides for guiding optical waves wherein the optical waves guided in the waveguides can be coupled out of the outfeed end faces and can be overlaid with one another for the formation of a diffraction grating.

A grating of this type is disclosed in an article by M. K. Smit entitled "New Focusing and Dispersive Planar Component Based on an Optical Phased Array", Electron Lett. Mar. 31, 1988, Vol. 24, No. 7, pp. 385–386. In this known grating, thirty-one strip-like optical waveguides are arranged side-by-side. Each of these waveguides is composed of an $Al_2O_3$ rib waveguide having a width of 3 $\mu m$. The spacing between neighboring rib waveguides is 6 $\mu m$. The rib waveguides are conducted along a segment having an aperture angle of 30° on concentric circles having a radius of 910 $\mu m$ to 1090 $\mu m$. Every rib waveguide comprises an infeed end face at one side for infeeding a part of an optical wave to be conducted into the grating and comprises an outfeed end face at the other side for coupling this part out of the waveguide. Since the waveguides are guided on concentric circles along a segment having a defined aperture angle, neighboring waveguides having a difference in their optical length, and the amount of difference is the same for all neighboring waveguides. This difference in the optical lengths of the waveguide causes a mutual phase shift on the part of the optical wave to be coupled into the grating that is carried from the output aperture to the output aperture of the grating. This phase shift is of the same size for all pairs of neighboring waveguides.

The known grating was operated for experimental investigation given a wavelength λ of approximate 0.63 $\mu m$ for the optical wave to be coupled into the waveguide. According to the published experimental values $\Delta\lambda/\lambda$ lies at 0.5%, i.e., $\Delta\lambda$ lies at approximately 3.3 nm given a cross talk attenuation of 20 dB and an angle $\delta\theta$ of approximately 3° between two orders of diffraction that can be read from a photograph so that it cannot be clearly derived whether the recited cross talk attenuation is meant optically or electrically.

Another known optical grating is disclosed in an article by H. Takahashi et al entitled "Arrayed-Waveguide Grating for Wavelength Division Multi/Demultiplexer with Nanometre Resolution" from *Electronics Lett.*, Jan. 18, 1990, Vol. 26, No. 2, pp. 87–88. In this grating, the plurality of strip-like optical waveguides are arranged side-by-side and are composed of composite monomode optical waveguides that are fashioned in a base layer of glass and are manufactured with a traditional photolithic technique. These waveguides have different lengths and bent sections having the same radius. Also in this known grating, a waveguide comprises an infeed end face at one side for the infeed of an optical wave to be coupled into the grating and comprises an outfeed end face at the other side for coupling this part out of the waveguide. The difference between the optical lengths of two neighboring waveguides is of the same size for all neighboring waveguides so that the parts of the optical wave coupled into the grating that are carried in the waveguides given this known grating also have a mutual phase shift from output aperture to output aperture that is the same size for all pairs of neighboring waveguides.

In an exemplary embodiment of this known grating, one hundred and fifty-five waveguides, each having a cross sectional dimension of 1.2 $\mu m \times 1.5$ $\mu m$ are integrated on a substrate. The spacing between respective two neighboring waveguides amounts to 8 $\mu m$ and the radius of every bent section is selected at 1 mm. Neighboring waveguides differ by 17.54 $\mu m$ in length. A wavelength resolution of less than 1 nm can be obtained with this exemplary embodiment. The optical wave to be coupled into the grating is coupled into the one hundred and fifty-five waveguides via a cylindrical lens. Given a wavelength of 1.3 $\mu m$, the wavelength resolution was capable of being experimentally set at 0.63 nm.

SUMMARY OF THE INVENTION

An object of the present invention is to provide a space-saving grating having a plurality of strip-like optical waveguides for guiding optical waves to be coupled out of the outfeed end faces to be overlaid with one another for the formation of a diffraction image.

The object is achieved by an improvement in the optical grating which comprises a plurality of side-by-side outfeed end faces of a plurality of strip-like optical waveguides for guiding optical waves, wherein the optical waves guided in the waveguides can be coupled out of the outfeed end faces and be overlaid with one another for the function of a diffraction grating. The improvements are that the waveguides are arranged in a branching structure comprising a single infeed end face for infeeding the optical wave to be coupled into the grating with the waveguide branching structure being composed of strip-like optical waveguides that proceed from the infeed face and branch tree-like at branching points and end at the outfeed end faces.

One advantage of the grating of the invention can be seen in that the space-saving "fan-in" structure is realized at the same time with which a simple infeed and distribution of an optical wave into or, respectively, in the grating is enabled and can be unproblematically directly coupled to an optical waveguide that supplies the optical wave and without the interposition of optical lenses and/or free beam propagation. The term "strip-like optical waveguides" includes all waveguides wherein the optical wave essentially propagates in only one direction and not in two directions, as in the case of planar waveguide layers. The strip-like waveguide can be integrated waveguides, for example rib waveguides or buried waveguides or even fibers.

As in the tradition grating of the species initially cited, the through waveguide paths that proceed from a first branching point of the waveguide branching structure and lead to different outfeed end faces can have different optical lengths given the grating of the invention, particularly so that the length difference between neighboring outfeed end faces is of the same size and is, thus, constant from outfeed end face to outfeed end face. A different optical length of the waveguide path is preferably achieved in the grating of the invention in that the two strip-like optical waveguides of the waveguide branching structure that branch at a branching point have a different optical length. This provides a space-saving device.

In the grating of the invention, the waveguide branching structure is preferably fashioned so that the optical wave supplied to a branch point is divided in equal parts into the strip-like waveguides that branch at this point. What can, thus, be achieved as needed is that the parts of the optical wave supplied to the grating that are coupled out from the outfeed end faces and subsequently overlaid are of the same intensity.

In the waveguide branching structure of the grating of the invention, the branch point is preferably defined by a waveguide fork composed of a strip-like waveguide branching in a Y-shape. What can be achieved by the selection of different optical lengths for the through waveguide paths leading to the different outfeed end faces is that the parts of the optical wave coupled into the grating that are guided in these paths and coupled out at various outfeed end faces are phase-shifted relative to one another. As a result of such a phase shift, the diffraction image generated by the grating by overlaying the outfeed parts can be modified. Over and above this, the diffraction image can be modified by a systematic phase response. Such a systematic phase response can be achieved in that an outfeed end face of an optical waveguide is arranged obliquely relative to the propagation direction of the optical wave guided in this waveguide structure. This systematic phase response within the end face can be achieved by such an oblique positioning, for example when the end face is a refractive end face that is defined by the discontinuity in the index of refraction or refractive index.

The systematic phase response can be realized by oblique positioning of the outfeed end face, not only given the grating of the invention, but also be realized given gratings of the species initially cited, for example given the known gratings set forth above.

The grating of the invention can be employed as a unidirectional and bidirectional multiple wavelength multiplex/demultiplex coupler for integrated optics. Monolithically integrated modules on InGaAsP/InP for a medium channel spacing of 20 nm can be realized.

Other advantages and features of the invention will be readily apparent from the following description of the preferred embodiments, the drawings and claims.

BRIEF DESCRIPTION OF THE DRAWINGS

FIG. 1 is a schematic plan view of an optical grating of the invention having a waveguide branching structure with eight output apertures;

FIG. 2 is a plan view of a modification of the exemplary embodiment wherein the waveguide path of the structure that leads from the first branch point of the waveguide branching structure to the different output apertures have different optical lengths;

DESCRIPTION OF THE PREFERRED EMBODIMENTS

Figure 3:
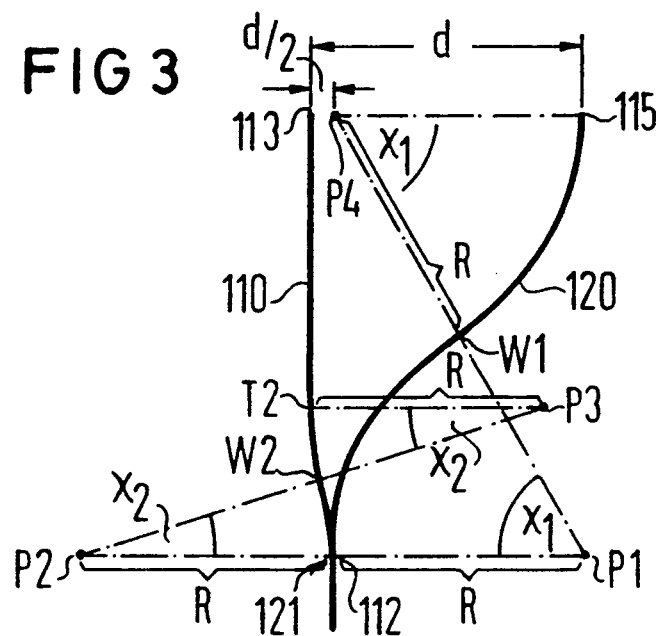
FIG. 3 is an enlarged plan view of a rectangular frame contained in the broken lines 108 of FIG. 2.

The principles of the present invention are particularly useful in a waveguide branching structure, generally indicated at 9. The waveguide structure 9, which can be integrated on a substrate 200, for example of a InGaAsP/InP substrate, has an input or infeed end face 111 for receiving an optical wave eoW, which will be coupled into a first waveguide 100. The waveguide 100 branches at a first waveguide fork 121 at a branch point 112 into waveguides 110 and 120. These parts or waveguides 110, 120 are guided to second waveguide forks 131 and 151, respectively, which are located at second branch points 113 and 115 of the waveguide branching structure 9. At each second waveguide fork 131 and 151, the waveguide 110 is branched at the point 113 into two waveguides 11 and 31, while the waveguide 120 is branched at the point 115 into waveguides 51 and 71. These waveguides 11, 31, 51 and 71 extend to third waveguide branch or forks 122, 123, 125 and 127, respectively, with the third branch 122 being at a branch point 101, wherein the waveguide 11 branches into the waveguides 1 and 2, the waveguide 31 at a branch point 103 of the third waveguide fork 123 branches into waveguides 3 and 4. The waveguide 51 at the third waveguide fork 125 at a branched point 105 branches into the waveguides 5 and 6 and the waveguide 71 at the third waveguide fork 127, which is located at the branch point 107 branches into the waveguides 7 and 8. These waveguides 1-8 have output faces 10, 20, 30, 40, 50, 60, 70 and 80, respectively.

Of the waveguide paths that lead from the infeed end face 111 through the waveguide branching structure 9 to the various outfeed faces 10-80, the waveguide path leading to the outfeed face 10 is formed of the successive waveguides, such as 100, 110, 11 and 1. In a similar manner, the waveguides 100, 110, 111 and 2 form the waveguide path leading to the outfeed end face 20. The waveguide leading to the outfeed face 30 is the waveguide sections 100, 110, 31 and 3, while the waveguide sections 100, 110, 31 and 4 lead to the outfeed end face 40. To reach the outfeed face 50, successive waveguides 100, 120, 51 and 5 are utilized, whereas successive waveguide paths 100, 120, 51 and 6 will lead to the outfeed end face 60. To go from the end face 111 to the end face 70, the optical wave passes through waveguides 100, 120, 71 and 7, whereas to get to the output end face 80 from the input end face 111, the optical wave passes through portions 100, 120, 71 and 8.

The waveguide structure of FIG. 1 has three branching levels, a first comprising the first branching point 112, the second comprising the two second branching points 113 and 115, and the third comprising the four branching points 101, 103, 105 and 107. As a result thereof, eight outfeed end faces 10-80 can be obtained. In general, $2^n$ power outfeed end faces can be obtained for a branching structure of FIG. 1 comprising n branch levels, wherein n is an arbitrary, natural number.

A waveguide structure of FIG. 1 having n branching stages, in general, can be fashioned so that all the waveguide paths leading from the infeed end face to the various outfeed end faces have the same optical length or so that the waveguide paths have different optical lengths are present. Thus, in particular, all waveguide paths can have optical lengths differing from one another.

In order for a grating to have a constant phase shift from the output end face to the output end face, the optical length of the waveguide paths must differ by a constant optical length $\Delta L$ from the outfeed end face to the outfeed end face. Such a grating can be obtained in the following way with a branching structure having n branched levels. The two waveguides leading from every branch point of the $n^{th}$ power and, thus, the last branch level to the two neighboring outfeed end face allocated to this point differ in optical length by $\Delta L$. The waveguides leading from every branch point of the $i^{th}$ branch level to the two branch points of the $(i+1)^{th}$ branch level allocated to this point differ in optical length by $2^{n-1}\Delta L$, wherein $i=1, 2, \ldots n-1$ applies. When L indicates the optical length of the waveguide path leading from the infeed end face to the first outfeed end face at the start of the row composed of the $2^n$ outfeed end faces, then the optical length of the waveguide path leading from the infeed end face to the $j^{th}$ outfeed end face is equal to $L+(j-1)\Delta L$, wherein $j=1$ through $2^n$.

These rules are realized for $n=3$ in the exemplary embodiment of FIG. 2. The optical lengths of the waveguides 110 and 120 proceeding from the first branch point 112 and, thus, from the first branch level differ by $4\Delta L$. The optical lengths of the waveguides 11 and 31 or, respectively, 51 and 71 proceeding from every second branch point 113 or, respectively, 115 and, thus, from the second branch level differ by $2\Delta L$ and the optical length of the waveguides 1 and 2, 3 and 4, 5 and 6, and 7 and 8 proceeding from every third branch point 101, 103, 105 or, respectively, 107, and, thus, from the third and last branch level, differ by $\Delta L$. When the optical length of the waveguide path leading from the first branch point 112 to the outfeed end face 10 amounts to L, then the length of the waveguide paths leading from the branch point 112 to the output end face 80 amounts to $L+7\Delta L$.

In the exemplary embodiment of FIG. 2, the difference in the path length from every branch point of a branch level to the two allocated branch points of the next branch level or to the two allocated outfeed end faces are geometrically similar for all branch levels and are fashioned according to a uniform design principle.

This design principle may be derived from FIG. 3, wherein standing for all other waveguide pairs, the two waveguides 110 and 120 leading from the first branch point 112 to the two second branch points 113 and 115 are shown in an enlarged manner. According to this principle, the two waveguides 110 and 120 proceed on a straight line and on curved or circular arcs. From the branch point 112, the two waveguides 110 and 120 proceed first on circular arcs having centers P2 or P1, respectively, wherein the arcs touch in the branch point 112 with a common tangent that forms a longitudinal axis of the infeed waveguide 100. A Y-shaped waveguide branch 121 is defined by these circular arcs.

In turning points W2 or, respectively W1, the circular arcs of both waveguides 110 and 120 convert into oppositely curved, second circular arcs having center points P3 or P4, respectively, whereby the second arcs respectively end in points T2 or 15, respectively, with a tangent parallel to the tangent of the first circular arcs at the branch point 112. At least the waveguide having the shorter optical length, the waveguide 110 in this particular example, proceeds on a straight line following the second circular arc in the direction of the tangent at the end point of this circular arc, which is the point T2 in the example, up to the allocated next branch point, which is the branch point 113.

Specifically, the radius R of all four circular arcs are selected of the same size and, moreover, selected so that the second circular arc of the waveguide having the longer optical length ends in the branch point of the next branch level. In the example, this is the waveguide 120 that ends in the branch point 115.

Valid under these conditions for an optical length difference of $2(n-i)\Delta L$, wherein $i=1$ through $(n-1)$ to be achieved and for the distance d between the end points of the two waveguides are the equations:

$$d = R*(2-\cos\chi_1 - \cos\chi_2)$$

$$\Delta L = 2R*\{(\chi_1 - \sin\chi_1) - (\chi_2 - \sin\chi_2)\}$$

wherein $\chi_2$ is the arc angle of the two circular arcs of the waveguides having the shorter optical length and $\chi_1$ is the arc angle greater in comparison to $\chi_2$ of each of the two circular arcs of the waveguide having the longer length.

The overall branching structure of FIG. 2 is composed of branching waveguides of FIG. 3, wherein the correct optical length difference is to be selected in each of the n branch levels. For the $i^{th}$ branch level having $i=1$ through n, the correct optical length difference is established by $2^{(n-i)} \cdot \Delta L$ given the optical length different $\Delta L$ prescribed for the waveguide paths. Moreover, the infeed waveguide should have a tangent in every branch point that coincides with the tangent of the waveguide continuing from this point or is aligned to this tangent.

The waveguides branching from a branch point can also proceed along curves other than circular arcs and straight lines. It can be beneficial, in view of achieving a compact structure when the y-branchings in the branch point are, themselves, already curved, for example so that the waveguide branching from a branching point follows a curved line.

Figure 4:
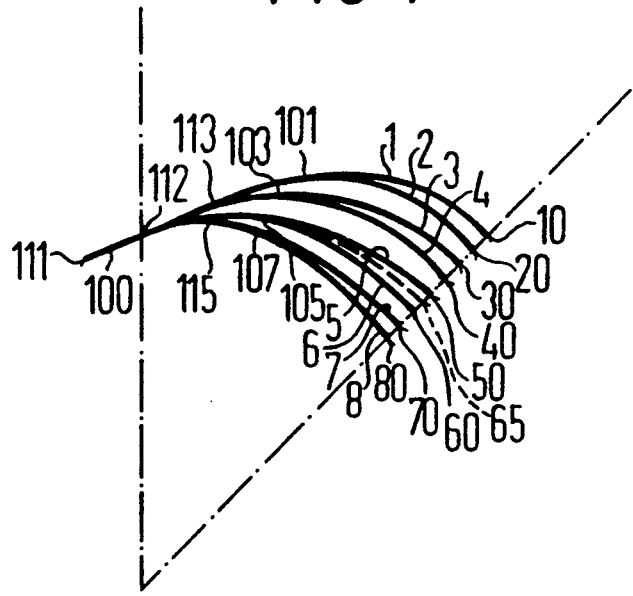
FIG. 4 is another exemplary embodiment of a grating of the present invention having wavelength forks that are shaped differently in comparison to the example of FIG. 2 so that the waveguide paths of the tree-like waveguide branching structures leading to different output apertures have different optical lengths.

An example of such a grating is illustrated in FIG. 4. The grating of FIG. 4 has waveguide branching from a branch point proceeding differently from a circular arc and at both sides of a curved center line from which the branching waveguides are identically distanced at every point. An example of such a center line for the branch point 105 and for the waveguides 5 and 6 branching off therefrom is shown by a broken line 65 in FIG. 4.

The grating of FIG. 4 is extremely compact and exhibits the property of the grating of FIG. 2, for example the optical length of each of the waveguide paths leading from the infeed end face 111 of the grating to the various outfeed end faces 10-80 changes by an optical length difference $\Delta L$ from outfeed end face to outfeed end face.

Figure 5:
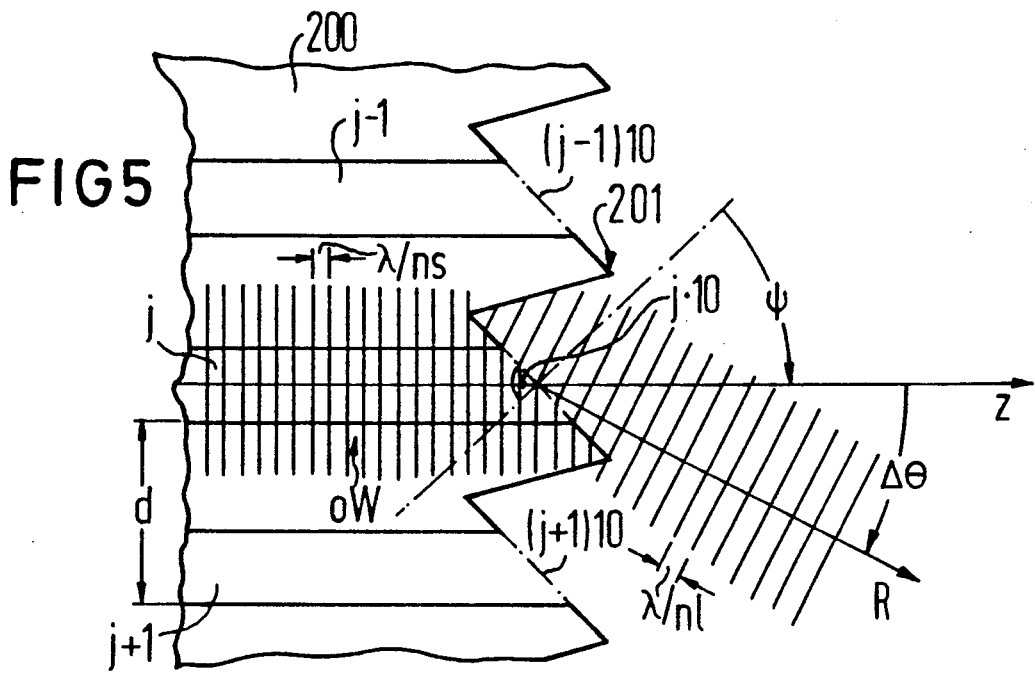
FIG. 5 is an enlarged portion of an end section of an output side of an exemplary embodiment of the grating of the present invention having outfeed end faces arranged obliquely relative to the propagation direction of the part of the optical wave coupled into the grating that are guided in the waveguides, with these outfeed end faces effecting a systematic phase response.

Given the portion of an end section at the output side of a grating of the invention shown in FIG. 5, the strip-shaped waveguides $1, 2, \ldots j-1, j, j+1, \ldots 2^n$ that are integrated on a substrate 200 and proceed parallel in a z-direction. Only three neighboring waveguides $j-1, j$ and $j+1$ are shown for reasons of clarity and they end at an optical reflective surface 201 structured with a saw-tooth-like shape that largely stimulates the action of the classical blaze grating. Each of the waveguides ends on the allocated surface section of the end face 201 that is inclined at the same angle obliquely relative to the z-direction and each respectively form an optically refractive outfeed end face for the respective waveguide. In FIG. 5, these surface sections form the outfeed end faces for the waveguides j−1, j, j+1 are referenced (j−1) 10, and (j+1)10.

An optical wave oW, which is guided in each of these waveguides in the z-direction to the outfeed end face, exits from these outfeed end faces in a direction R pointing to the maximum of the envelope of the diffraction image generated by this grating and describable by the diffraction function. This direction R is inclined by an angular difference of $\Delta\theta$ relative to the z-direction. This angular difference $\Delta\theta$ is defined by the equation $$\sin\Delta\theta = \frac{n_S}{n_L} \sin\Psi\cos\Psi - \sqrt{1 - \left(\frac{n_S}{n_L}\right)^2 \sin^2\Psi} \ \sin\Psi$$

wherein $N_s$ indicates the index of refraction of the waveguide, $n_L$ indicates the index of refraction of a medium adjoining the waveguide at the outfeed end face and $\Psi$ denotes the angle between the perpendicular erected from the outfeed end face and the z-direction.

For small refractive index discontinuities $\Delta n = n_s - n_L$, this equation can be approximately be replaced by:

$$\sin\Delta\theta \approx \frac{\Delta n}{n_L} \tan\Psi.$$

These equations are not limited to the specific embodiment of FIG. 5, but are valid for all embodiments wherein a refractive index discontinuity $\Delta n$ is present at the outfeed end faces and wherein these end faces are arranged at an angle obliquely relative to the propagation direction z of the optical waves guided in the waveguide leading to these end faces.

When, in such an embodiment, it is simultaneously seen to that phase of the guided optical wave coincides in the center of every outfeed end face given every wavelength $\lambda$, the envelope of the diffraction image is shifted, but the position of the individual diffraction orders relative to one another in the diffraction image is preserved. This can be achieved with a grating wherein the waveguide paths leading from the infeed end face to the various outfeed end faces all have the same optical length. In the grating of FIG. 4, this can be achieved by a completely symmetrical waveguide branching structure, whereby an especially compact structure occurs because additional optical paths for realizing a response difference from outfeed end face to outfeed end face are eliminated.

For achieving an optimally great angular difference $\theta$, it is beneficial to select $\Delta n$ optimally large. In integrated strip waveguides, $n_s$ is prescribed within relatively narrow limits. The index of refraction $n_L$ of the adjoining medium, by contrast, can be varied within a broad range on the basis of a suitable selection of this medium. When, for example, it is not a layer waveguide but a uniform medium, for example air, that is selected for the medium, then an adequately large index of refraction discontinuity $\Delta n$ and, thus, great angular differences $\Delta\theta$ are achieved. For focussing the diffracted light onto a detector line, an aspherical optics, for example a cylindrical lens, is then expediently employed, since the near field of the strip waveguide and, thus, the envelope of the diffraction image are approximately circular.

Figure 6:
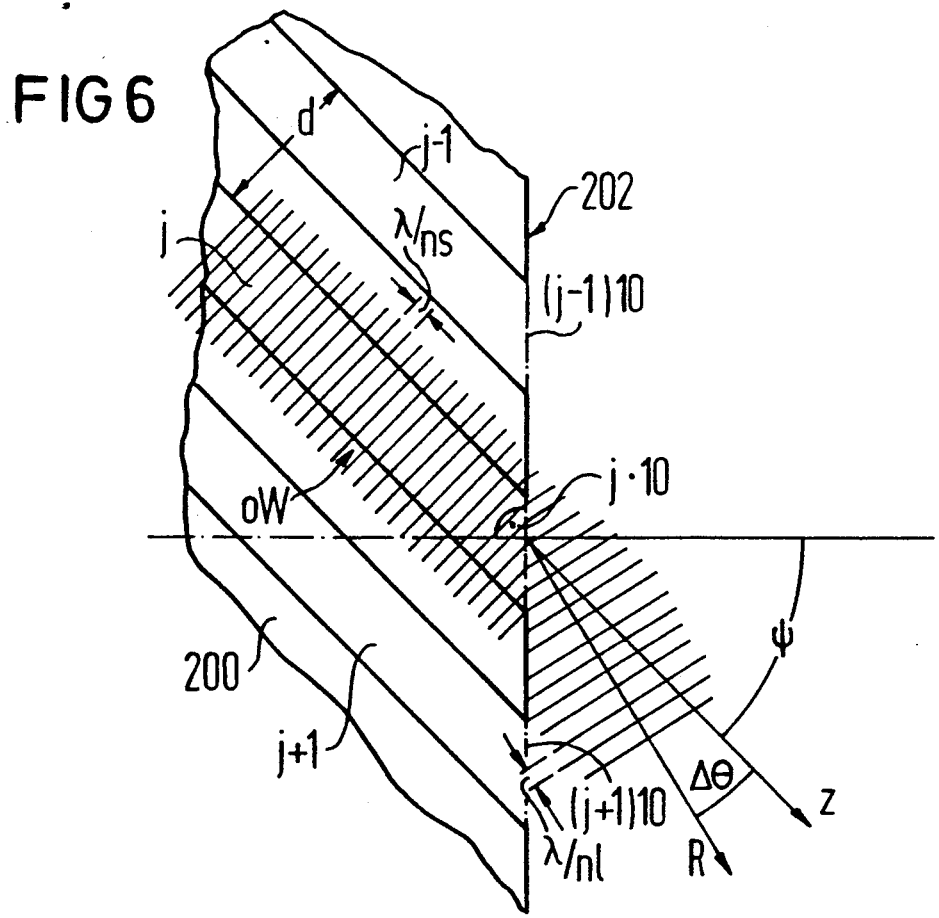
FIG. 6 is an enlarged portion of an end section of an output side of another exemplary embodiment of the grating of the present invention having outfeed faces arranged obliquely relative to the propagation direction of the part of the optical wave coupled into the grating that are guided in the waveguides, these outfeed end faces causing a systematic phase response.

In the portion of an end section of an output side of a grating of the invention having a symmetrical phase response shown in FIG. 6, the waveguides j−1, j, j+1 integrated on the substrate 200 and proceeding parallel in the z-direction and in a planar, optically refractive surface 202 that is arranged obliquely relative to the z-direction. The outfeed end faces of the waveguides j−1, j or, respectively, j+1 are referenced (j−1)10, j10 and (j+1)10, as in FIG. 5, and lie in the plane of the end face 202 of FIG. 6. A perpendicular erected onto the end face 202 describes an angle $\Psi$, with the z-direction and an optical wave oW, which is guided in the waveguide, propagates after exit from the appertaining outfeed end face in the direction R pointing to a maximum of the envelope to the diffraction image. This direction R describes the angular difference $\Delta\theta$ with the z-direction.

In this embodiment of FIG. 6, the phase difference from outfeed end face to outfeed end face must be prevented by a suitable waveguide branching structure. This may be achieved, for example, by guidance of the waveguides on concentric equidistance circular arcs along a segment having the aperture angle $\chi = \tan\Psi$.

One can also proceed on the basis of the grating of FIG. 2 or FIG. 4, wherein the waveguides 1–8 leading to the outfeed faces 10–80 are greatly lengthened so that the straight line end sections that are parallel and of equal length are present in these waveguides and in the outfeed end faces. The optical waveguide path leading from the infeed end face to the outfeed end face also differs in such a grating by the optical length difference $\Delta L$ from outfeed end face to outfeed end face. On the basis of a section conducted on a straight line obliquely relative to the longitudinal direction of the straight line, parallel waveguide sections, these can be shortened so that the optical waveguide paths leading from the infeed end face to the section surface corresponds to the end face 202 in FIG. 6 and have the same optical length. A grating of FIG. 6 is thereby realized that has only a systematic phase response, but not a phase response from outfeed end face to outfeed end face.

The oblique arrangement of the outfeed end face relative to the propagation direction of the optical waveguide and waveguides can be advantageously in the dimensioning, particularly when free beam propagation and non-guidance in a layer waveguide follows.

A self-focussing effect can be achieved with a slight modification of the waveguide branching structure of the invention similar to the case in the reference of *Electronics Letters*, Jan. 18, 1990, cited hereinabove, so that the imaging lenses are superfluous. The interfering light emerging from the outfeed end faces can be directly focused onto the detectors, whereby this light can be guided in a layer waveguide adjoining the outfeed end faces.

This focussing effect can be achieved in that the optical length L of the waveguide paths that lead from the infeed end face of the waveguide branching structure to the various outfeed end faces are selected so that the grating acts self-focussing. For example, the above-mentioned $\Delta L$ is then not constant, but, for example, a weakly changing function of the location.

Although various minor modifications may be suggested by those versed in the art, it should be understood that I wish to embody within the scope of the patent granted hereon all such modifications as reasonably and properly come within the scope of my contribution to the art.

I claim:

1. In an optical grating comprising a plurality of side-by-side outfeed end faces of a plurality of strip-like waveguides for guiding optical waves, wherein the optical waves guided in the waveguides are coupled out of the outfeed end faces and are overlaid with one another for the formation of a diffraction grating, the improvements comprising the optical waveguides being a part of a waveguide branching structure comprising a single infeed end face for infeeding an optical wave to be coupled into the grating, said waveguide branching structure being composed of strip-like optical waveguides that proceed from the single infeed end face through tree-like branches and branch points to end in the outfeed end faces.

2. In an optical grating according to claim 1, wherein each two strip-like optical waveguides of the waveguide branching structure extending from each branch point have a different optical length.

3. In an optical grating according to claim 2, wherein the optical wave supplied to the branch points of the waveguide branching structure is divided in equal parts into the optical waveguides extending from each branch point.

4. In an optical grating according to claim 3, wherein each of the branch points of the waveguide branching structure is defined by a waveguide fork of a strip-like waveguide that branches in a Y shape.

5. In an optical grating according to claim 4, wherein the outfeed end faces of the optical waveguides are arranged obliquely relative to the propagation direction of the optical wave being guided in said waveguides.

6. In an optical grating according to claim 3, wherein the outfeed end faces of the optical waveguides are arranged to extend obliquely relative to the propagation direction of an optical wave being guided in the respective waveguides.

7. In an optical waveguide according to claim 2, wherein the outfeed end faces of the optical waveguides are arranged obliquely relative to the propagation direction of the optical wave being guided in said waveguides.

8. In an optical grating according to claim 1, wherein the optical wave being supplied to each of the branch points of the waveguide branching structure is divided into equal parts for each of the optical waveguides extending from said branch point.

9. In an optical grating according to claim 8, wherein the outfeed end faces of the optical waveguides are arranged obliquely relative to the propagation direction of the optical wave guided in each of the waveguides.

10. In an optical grating according to claim 1, wherein each of the branch points of the waveguide branching structure is defined by a waveguide fork of a strip-like waveguide having a Y-shaped branch.

11. In an optical grating according to claim 10, wherein the outfeed end faces of each of the optical waveguides is arranged to extend obliquely relative to the propagation direction of the optical wave being guided in said waveguide.

12. In an optical grating according to claim 1, wherein the outfeed end faces of the optical waveguide are arranged obliquely relative to the propagation direction of the optical wave being guided in said waveguides and lie on a saw-tooth edge of a substrate.

13. In an optical grating according to claim 1, wherein the outfeed end faces of the optical waveguides are arranged obliquely relative to the propagation direction of the optical waves being guided in said waveguides, and the optical length of each of the waveguide paths that lead from the infeed end face of the waveguide branching structure to the various outfeed end faces are selected so that the grating acts as a self-focussing grating.

14. In an optical grating comprising a plurality of side-by-side outfeed end faces of a plurality of strip-like waveguides for guiding optical waves, wherein the optical waves guided in the waveguides are coupled out of the outfeed end faces and are overlaid with one another for the formation of a diffraction grating, the improvements comprising the optical waveguides being a part of a waveguide branching structure comprising a single infeed end face for infeeding an optical wave to be coupled into the grating, said waveguide branching structure being composed of strip-like optical waveguides forming separate waveguide paths that proceed from the single infeed end face through tree-like branches and branch points to end in the outfeed end faces, each of the waveguide paths leading from the single infeed end face of the waveguide branching structure to the various outfeed end faces having an optical length that is selected so that the grating acts as a self-focussing grating.

15. In an optical grating according to claim 14, wherein each two strip-like optical waveguides of the waveguide branching structure extending from each branch point have a different optical length.

16. In an optical grating according to claim 15, wherein the optical wave supplied to each branch point of the waveguide branching structure is divided in equal parts into the optical waveguides extending from each branch point.

17. In an optical grating according to claim 16, wherein each of the branch points of the waveguide branching structure is defined by a waveguide fork of a strip-like waveguide that branches in a Y-shape.

18. In an optical grating according to claim 17, wherein the outfeed end faces of the optical waveguides are arranged obliquely relative to the propagation direction of the optical wave being guided in said waveguides.

19. In an optical grating according to claim 14, wherein the optical wave being supplied to each of the branch points of the waveguide branching structure is divided into equal parts for each of the optical waveguides extending from said branch point.

20. In an optical grating according to claim 14, wherein each of the branch points of the waveguide branching structure is defined by a waveguide fork of a strip-like waveguide having a Y-shaped branch.

* * * * *